FIG-7

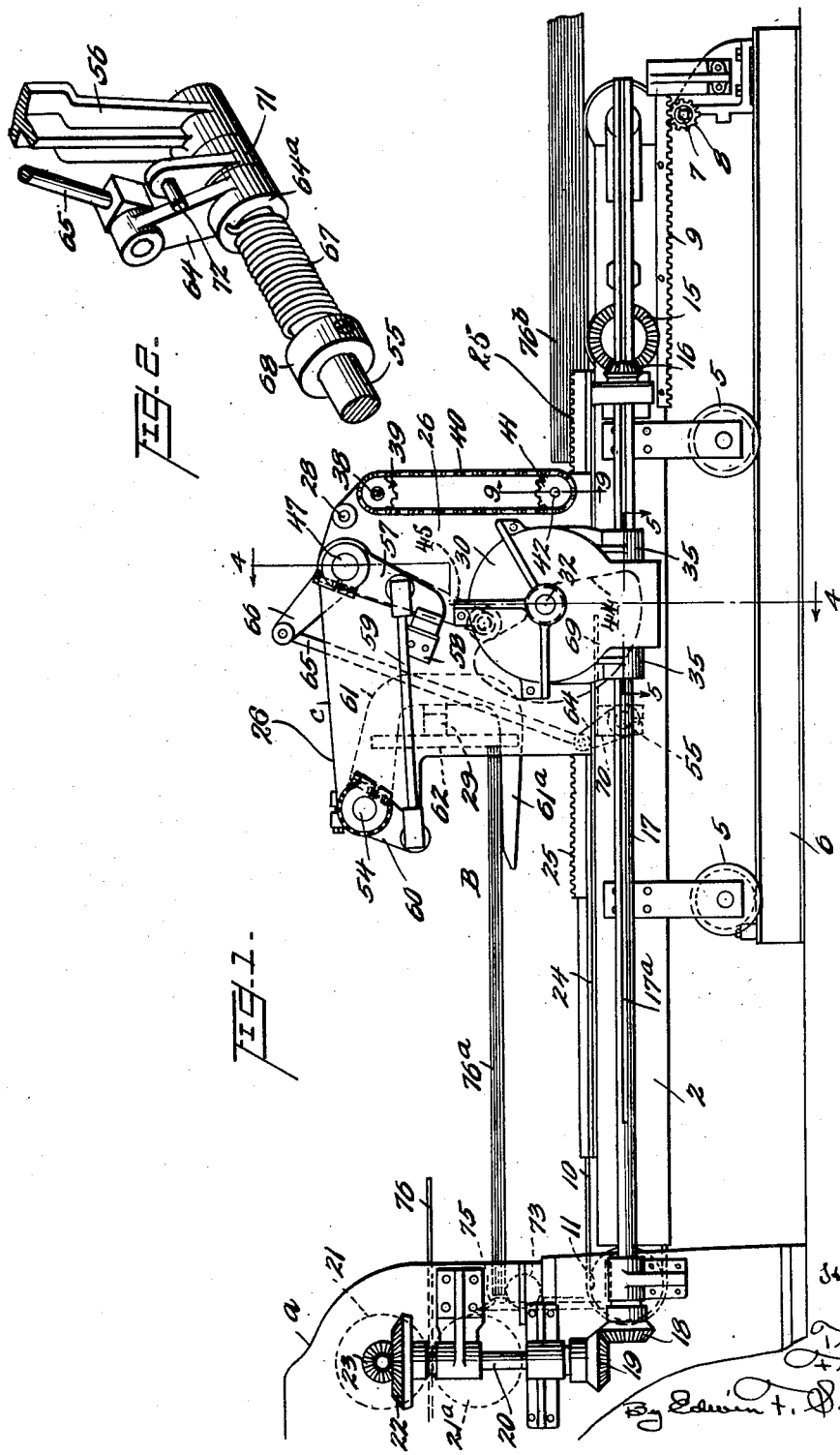

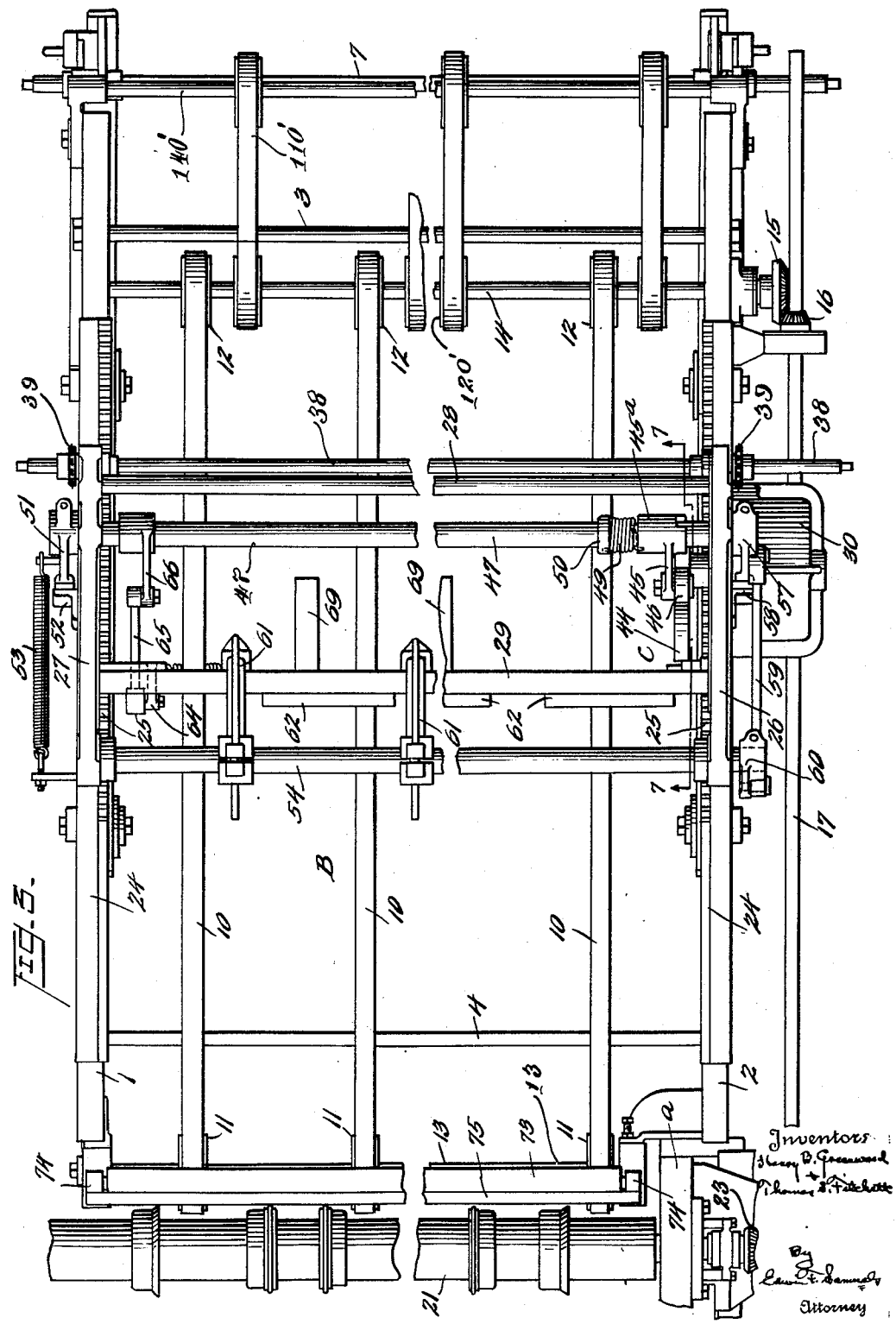

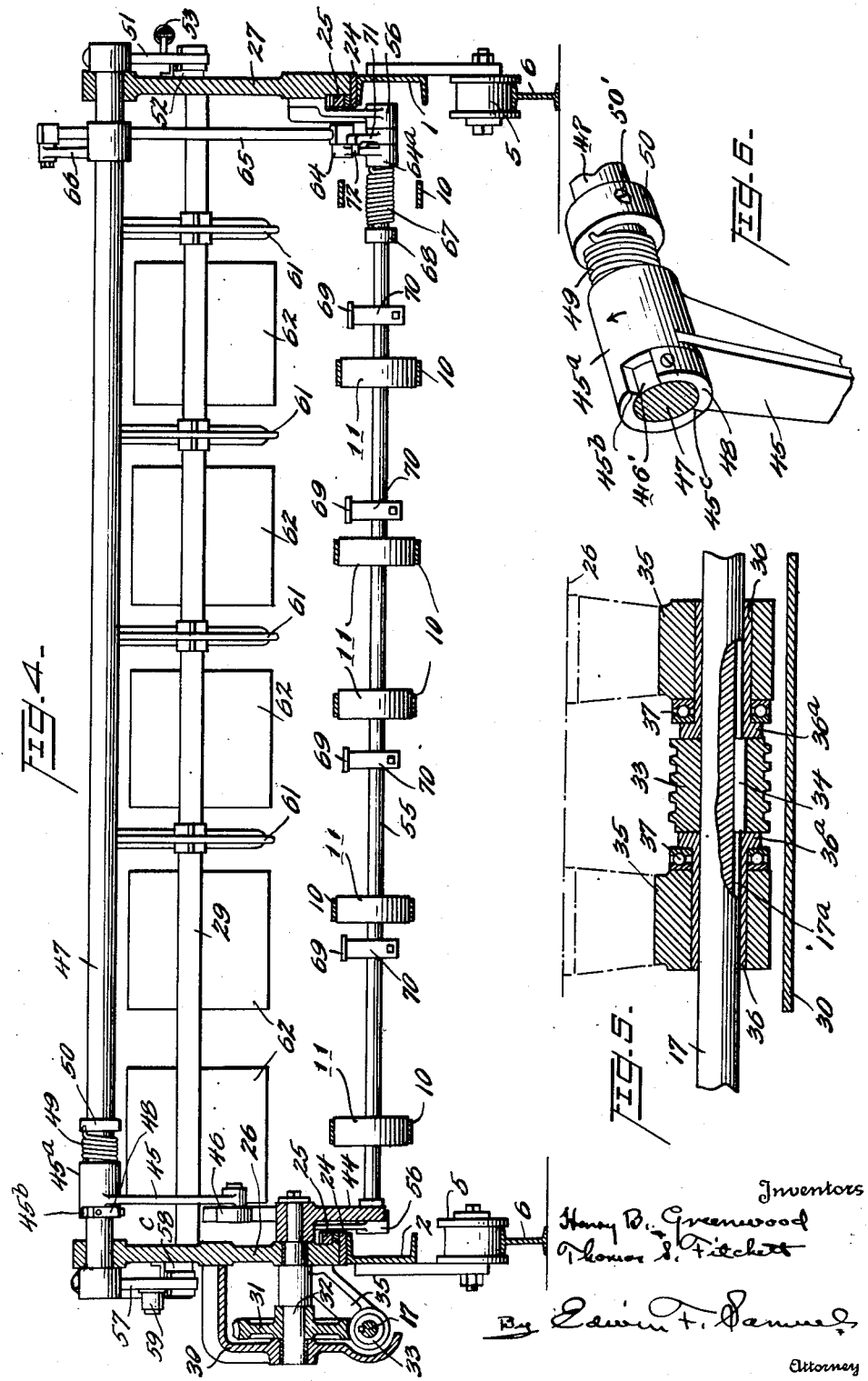

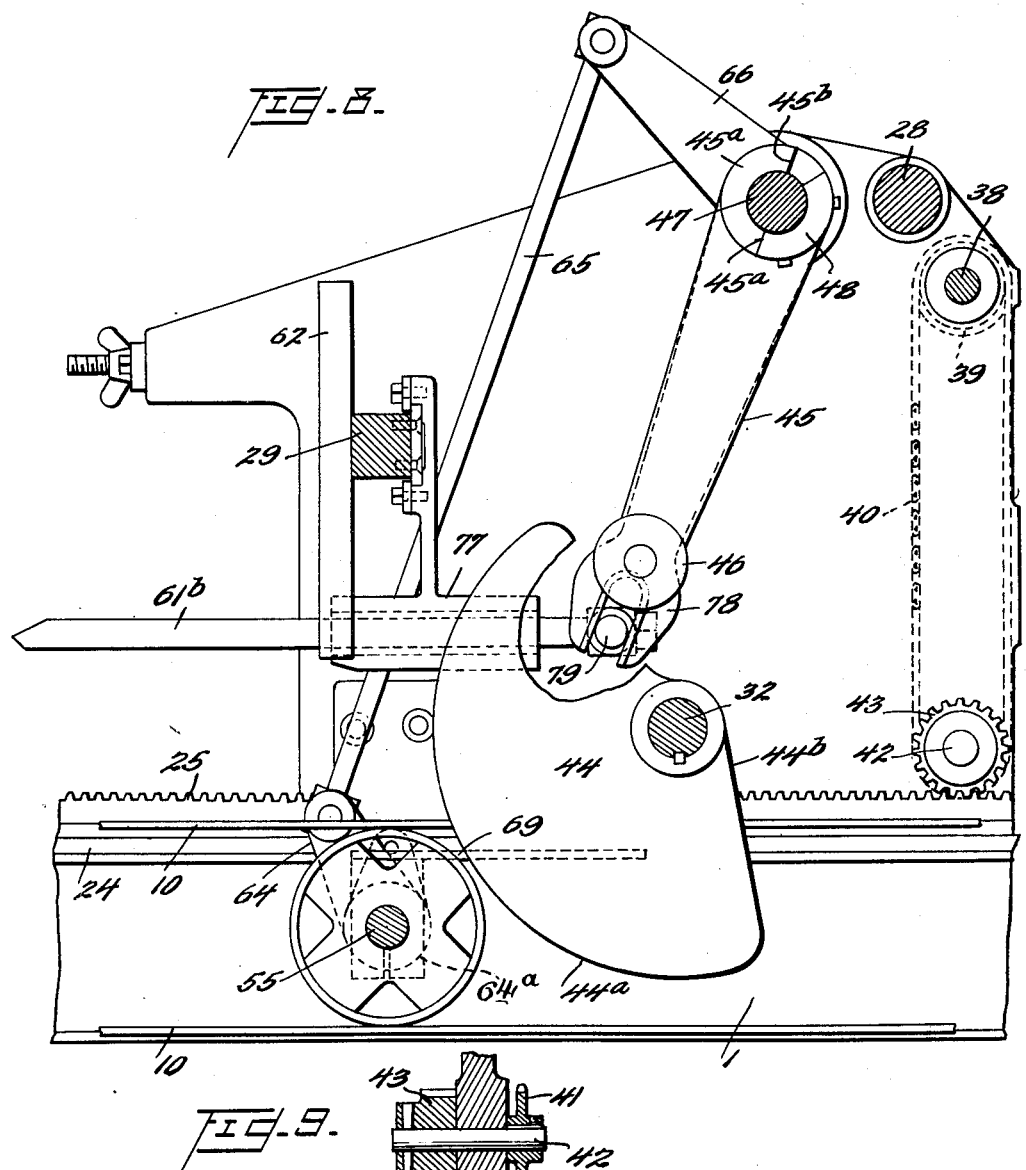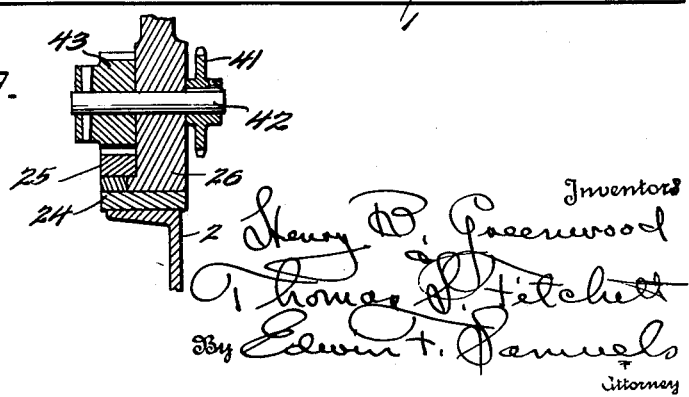

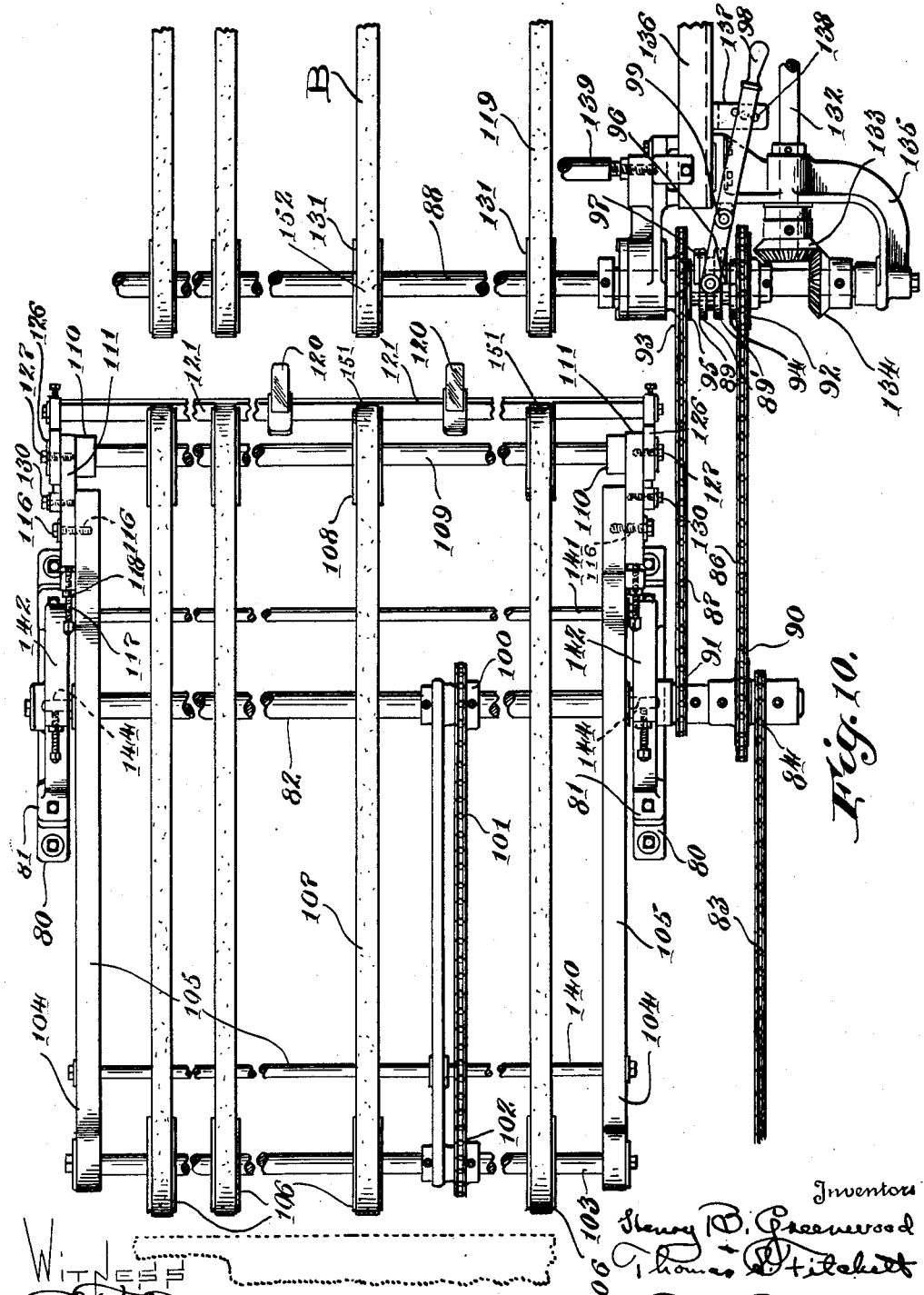

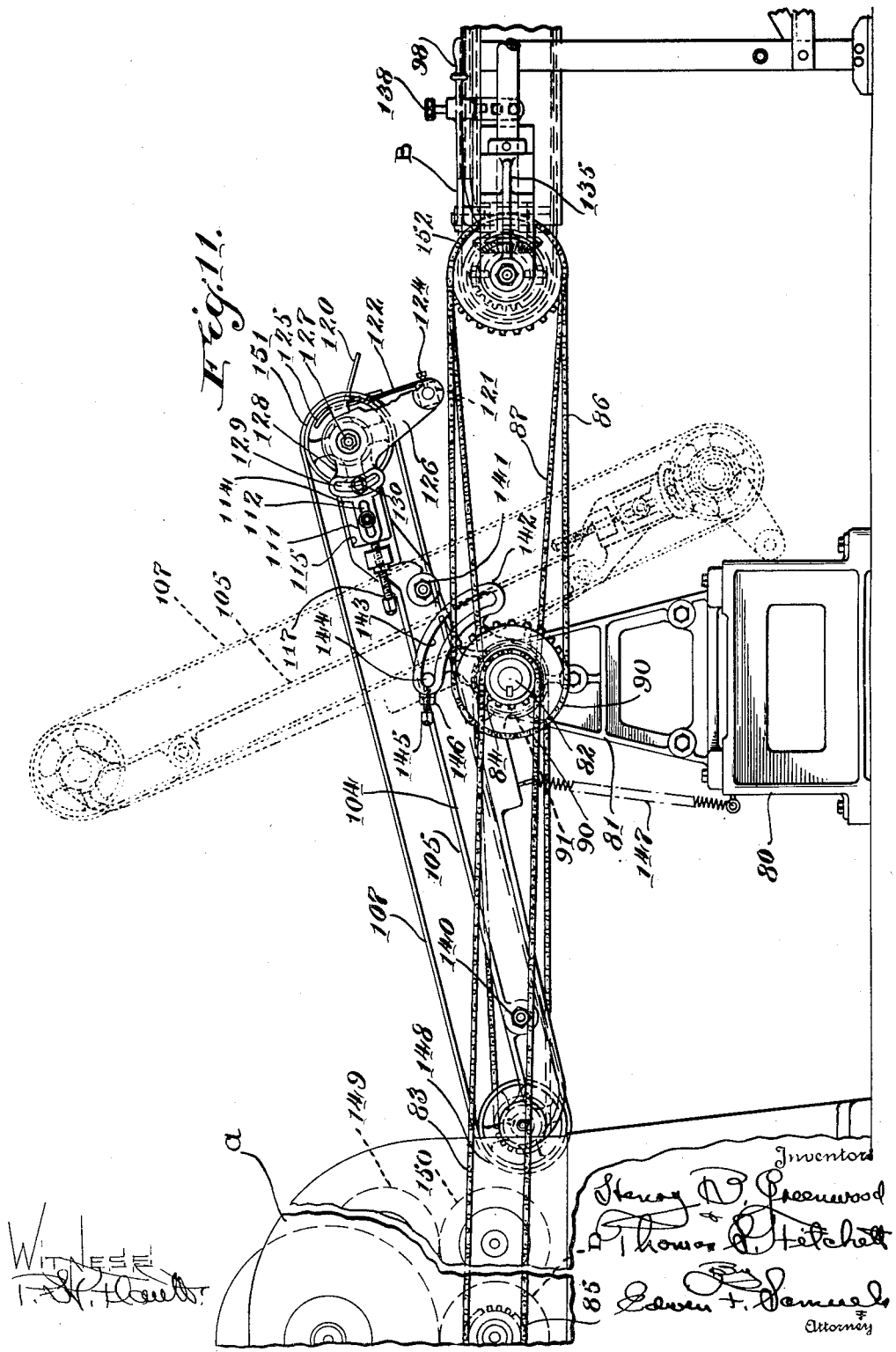

Patented Jan. 3, 1939

2,142,243

UNITED STATES PATENT OFFICE 2,142,243

PILING DELIVERY

Henry B. Greenwood and Thomas S. Fitchett, Glenarm, Md., assignors to F. X. Hooper Company, Inc., Glenarm, Md., a corporation of Maryland Application October 14, 1936, Serial No. 105,494

18 Claims. (Cl. 93—36)

This invention relates to mechanism for piling box blanks in stacks, having a uniform number of blanks, as they come from a machine for operating on the blanks, such as a slotting and creasing machine, and for carrying the stacked blanks to the point of delivery, where they may be removed by an operator. The work of stacking goes on continuously while the machine is in operation, one stack being built up while a previously formed stack is being carried to the point of delivery and removed by the operator.

The object is to facilitate counting the delivered blanks and by assembling the blanks in uniform stacks to facilitate the work of the operator at the delivery end of the machine who has ample time to remove one stack while another is piling up ready for delivery. This method of stacking or piling, forms stacks each containing the same number of blanks, also assists in counting.

The invention also provides an adjustment for changing the number of blanks in each pile as delivered. Another feature which may be applied to the machine of the invention is a movably mounted conveyor, forwardly located as to the piling mechanism, to give free access to the box blank machine to which the piling delivery is applied, from which it receives the blanks to be piled.

The features of construction and the mode of operation of my invention will be clear from the following specification taken in connection with the drawings, which show the details of the machine in the form in which it has been constructed and operated, numerous changes and variations being contemplated without departure from the basic principles of the invention. In the drawings:

Fig. 1 is a side elevation of the mechanism for piling and delivering the blanks in stacks, showing also part of a slotting and creasing machine to which said mechanism is geared;

Fig. 2 is a detail perspective view of part of the shaft which rocks the movable stops, together with the parts which form a yielding connection between the shaft and its operating means;

Fig. 3 is a top plan view of the machine, partly broken away, showing also a part of the slotting and creasing machine;

Fig. 4 is a vertical transverse section about on the line 4—4 of Fig. 1;

Fig. 5 is a section on the line 5—5 of Fig. 1, looking in the direction of the arrows;

Fig. 6 is a detail perspective view of the connections between the cam-operated rocker arm and the main rocker shaft;

Fig. 7 is a section on the line 7—7 of Fig. 3, showing the moving parts in full lines in one position and in dotted lines in another position;

Fig. 8 is a view similar to that shown in full lines in Fig. 7, illustrating a modified form of movable shelf or support for the box blanks, and, Fig. 9 is a section on the line 9—9 of Fig. 1.

Fig. 10 is a plan view of a modified form showing a shiftable conveyor between the front end of the piling delivery which is shown fragmentarily and the box blank machine. This figure also shows a gear shift for changing the number of blanks in a pile.

Fig. 11 is a side elevation of the portion of the machine shown in Figure 10 showing the conveyor in full lines and also showing it in dotted lines swung to a sharp angle to horizontal and approaching vertical position to give axis to the rear of the box blank machine.

Referring to Figs. 1, 2 and 4 of the drawings, a indicates the delivery end of a machine for creasing and slotting box blanks and B indicates the piling or stacking delivery mechanism of my invention, comprising a frame composed of side bars 1 and 2 suitably mounted upon wheels 5 which rest on parallel rails 6. The frame is adjustable toward and from the slotting and creasing machine by means of a shaft 7, journaled in stationary bearings and having pinions 8 thereon, near its opposite ends, the latter engaging racks 9 attached to the side bars. In Fig. 1, the rack and pinion at one side of the machine are shown and it will be understood that these are duplicated at the opposite side of the machine, although not shown in the drawings. Endless conveyor belts 10 are mounted upon pulleys 11 and 12, the pulleys 11 being secured to a shaft 13 at the end of the frame adjacent the creasing machine and the pulleys 12 being secured to a shaft 14 near the opposite end of the frame. The shaft 14 is driven by a bevel gear 15 which is engaged by a pinion 16 on a shaft 17 which latter is driven in synchronism with the printing and slotting mechanism. As shown in Fig. 1, the shaft 17 has a pinion 18 which is engaged by a pinion 19 on a shaft 20 which is mounted on the slotting and creasing machine and, as shown in Fig. 1, geared to a creasing roll 21 by gears 22 and 23. Forwardly of conveyor belts 10 are delivery belts 110' carried by pulleys 120' on shafts 14 and corresponding pulleys on shafts 140'.

Upon the side bars 1 and 2 of the frame are mounted tracks 24, and to each track is secured a rack bar 25. A carriage c is mounted upon the tracks, this carriage comprising side frames 26 and 27, suitably connected together as by crossbars 28 and 29. The carriage is adjustable along the tracks by means of a shaft 38 mounted in the upper part of the carriage frame, which may be rotated by a crank or wrench. This shaft has pinions 39 at its ends connected by chains 40 to pinions 41 on short shafts 42, Figure 9, journaled in the side plates. These latter shafts have pinions 43, Figures 1, 3, 8, 9, which engage the racks. Upon the side frame 26 is mounted a gear casing 30 (Fig. 4) which houses a worm gear 31, the latter mounted on a short shaft 32 which is journaled in the casing and the side frame 26. A worm pinion 33 Figs. 4 and 5 splined to the shaft 17 engages the worm wheel. The shaft has a long key-way 17ª which is engaged by the key 34 in the pinion. Brackets 35 project from the side frame 26 at opposite sides of the gear casing and the pinion is arranged between these brackets. As shown in Fig. 5, sleeve bearings 36 for the shaft are arranged in the brackets, each bearing having a flange 36ª which bears against the pinion 33, and thrust bearings 37 between the flanges and the brackets hold the pinion in place midway between the brackets, and the flanges hold the key in place. With this arrangement, when the carriage is adjusted along the main frame, the pinion will move with and be maintained in mesh with the worm gear 31 mounted on the carriage.

A cam 44, mounted on the shaft 32, is rotated at a relatively low speed by the worm gear 31, but is so designed as to impart to the arm or lever 45 periodic and relatively quick oscillations. This arm 45 is provided with cam follower 46 which is constantly pressed against the cam by spring 53 to be described. The arm is integral with or secured to a sleeve 45ª which oscillates on rock shaft 47 journaled in the upper part of the carriage. As shown in Fig. 6, the sleeve has a notch 46 in one end which is relatively long in a circumferential direction providing shoulders 45ᵇ and 45ᶜ. Stop 48 shorter than the notch is secured to the rock shaft, lying between the shoulders. The sleeve is limited in its rotary movement on the shaft by this stop. A coiled spring 49, surrounding the shaft, connects the sleeve with a collar 50 which is adjustably secured to the shaft by screw 50'. The spring 49 tends to rotate the shoulder 45ᵇ away from the stop 48. A lever 51 is secured to the opposite end of the rock shaft. This lever 51 is drawn toward a fixed stop 52 on the side plate 27 by said spring 53, and this spring, through the shaft 47, and the stop 48 and sleeve 45ª causes the lever 45 to press the roller 46 against the cam.

Figure 7:
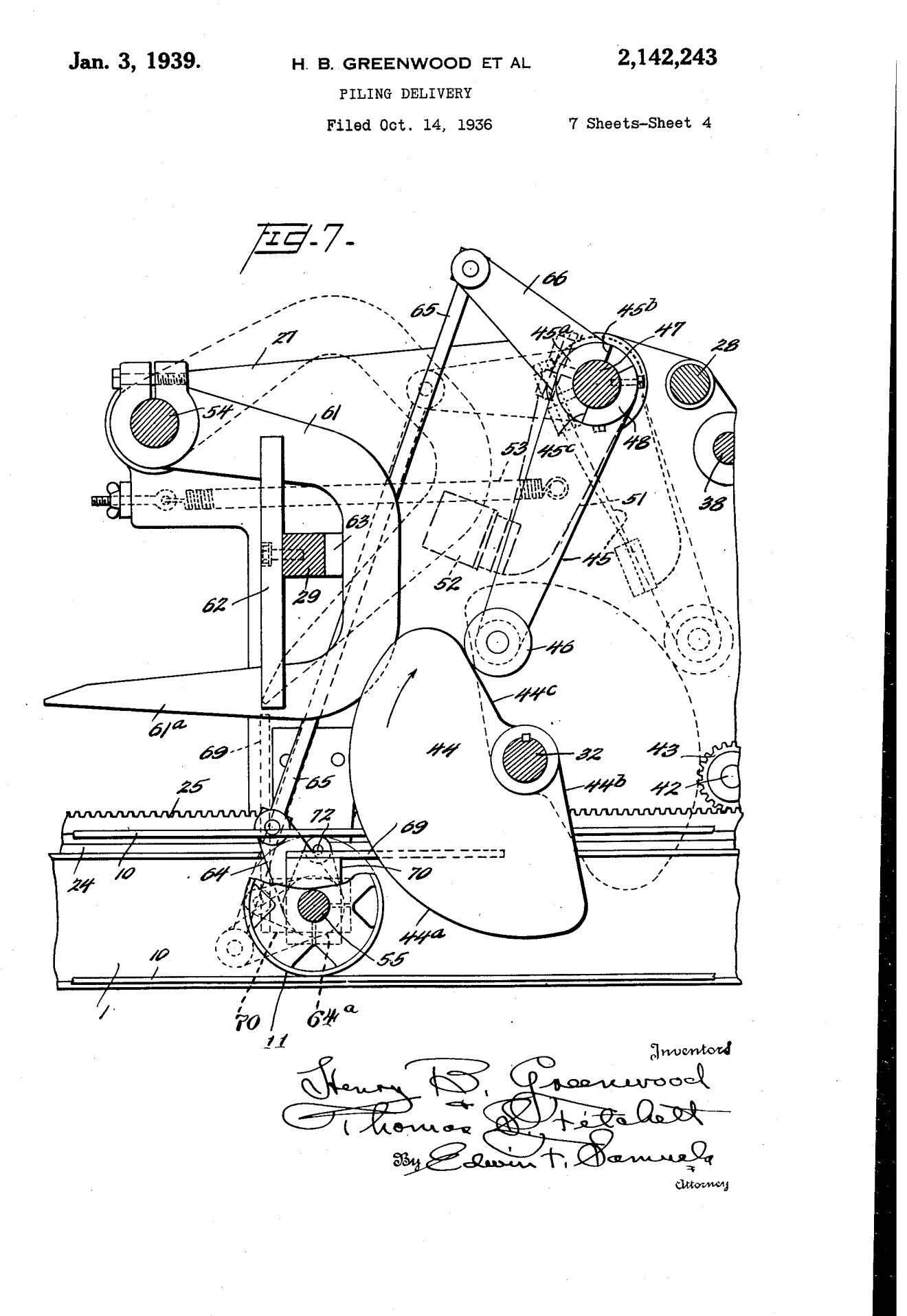

The cam 44 has an approximately semi-circular face 44ª and two steep faces 44ᵇ and 44ᶜ, the face 44ᵇ being preferably tangential to the hub of the cam and the latter approximately radial as shown. The cam rotates in the direction of the arrow, Fig. 7, and when the cam face 44ᶜ engages the roller as shown in Fig. 7, the rotation of the cam moves the rocker arm 45 back into the position shown in dotted lines in said figure, and the sleeve 45ª on the rocker arm 45, which engages the stop 48 on the shaft 46 rocks the arm 45ª against the tension of the spring 53. The rocker arm is held in this position while the semi-circular or concentric face 44ª of the cam is in engagement with the roller, and then the roller rides onto the steep face 44ᵇ of the cam and the spring 53 then returns the rocker arm 45 to the full line position in said figure, where it remains until again engaged and moved by the face 44ᶜ of the cam. The spring 49 holds or assists in holding the roller on the arm 45 against the cam face while the roller is passing onto the abrupt parts of the cam.

The movements imparted to the rock shaft 47 by the cam are imparted to a rock shaft 54 journaled in the upper part of the carriage frame and also to a rock shaft 55 journaled in brackets 56 depending from the side plates of the carriage. As shown in Figs. 1 and 3, an arm 57, secured to the rock shaft 47 is adapted to engage a stop 58 on the side plate 26, this arm and stop corresponding to the arm 51 and stop 52 at the opposite side of the carriage. The arm 57 is connected by link 59 to an arm 60, secured to the rock shaft 54. A number of U-shaped members shown in the form of arms 61 are secured to the transverse shaft 54 at suitable distances apart between the side plates c of the carriage for supporting the box blanks as hereinafter explained. Each of these members extends rearwardly from the rock shaft, thence downwardly and thence forwardly toward the slotting and creasing machine. The fore arms or lower arms 61ª of said arm members 61 serve as shelves or supports for the box blanks when the members 61 are in the full-line position shown in Figs. 1 and 7. When the cam swings the rocker arm 45 rearwardly, the U-shaped members are also rocked rearwardly as illustrated in dotted lines in Fig. 7, to release the box blanks. The cross-bar 29 (see Figure 8) extends between the arms of the several U-shaped supports and carries a series of fixed stop plates 62, located between the adjacent supports. These plates serve to stop the box blanks as they issue from the slotting and creasing machine. Buffers 63, of rubber or other suitable material, Fig. 7, may be secured to the cross-bar 29 in position to be engaged by the yokes of the supporting members 61 when the latter swing forwardly.

The shaft 55 (see Figures 1, 2, 4, and 8) has an arm 64 which is connected by link 65 to an arm 66 on the main rock shaft 47. The hub or sleeve 64ª of the arm 64 fits freely on the shaft, and as shown in Fig. 2, a cushioning spring 67, coiled about the shaft, connects the hub with a collar 68 adjustably secured to the shaft. A collar 71, secured to the shaft, carries a stop pin 72 against which the arm 64 normally rests. When the link 65 is thrust downwardly, the shaft is rocked by the spring 67 and collar 68 and when the link lifts the arm 64, said arm 64 bearing against the stop 72, returns the shaft. A number of flat metal strips 69, (Figures 4 and 7) which constitute movable stops, are supported on the shaft 55 by rectangular blocks 70 which are clamped to the shaft and suitably spaced apart from one another. These stops project rearwardly in horizontal position, as shown in Figs. 4 and 7, while the roller on the arm 45 is on the lower parts of the cam and the supports 61 are in the full-line position; but when the cam swings the arm 45 rearwardly, the link 65 moves downwardly and causes the shaft 55 to rock these stops 69 into the vertical position shown in dotted lines in Fig. 7. Thus when the supports 61 swing rearwardly, the stops 69 swing to the vertical position and remain there until the supports swing forwardly, when the stops will be returned to the horizontal position.

A roller 73, Figures 1 and 3, of small diameter hereinafter referred to as a delivery support for which any supporting device adapted to support and release the forward ends of the blanks may be substituted, is arranged at the forward end of the stacker in bearings 74 and the upper surface of this roller is approximately at the level of the upper surfaces of the lower arms 61ª of the movable supports 61. The upper surface of the roller 73 is below and slightly at the rear of the horizontal center of the lower creasing roll 21ª and a narrow guide plate 75 inclines downwardly from the latter roll toward the roller 73.

The operation is as follows: The carriage C of the stacking machine is adjusted so that the fixed stops 62 will be spaced from the top of the delivery support shown in the form of roller 73, and from the inclined guide plate 75, a distance slightly greater than the length of the blanks which are being operated upon and stacked. As the blanks 76, Fig. 1 issue in succession from the creasing and slotting machine, their advanced ends engage the fixed stops 62 and drop down onto the supports or shelves 61ª while their rear ends pass downwardly over the inclined guide plate 75 onto the roller 73 of the stacker. While a certain number of blanks are accumulating on the supporting devices 73 and 61ª, as shown in Fig. 1, a previously stacked number of blanks 76ᵇ is being carried to the delivery end of the stacker by the conveyer belts, the movable stops 69 being at this time in horizontal position to permit the stack to pass over them. If the stack consists of ten blanks, for instance, five blanks will accumulate on the supports while the ten previously piled are being carried to the rear of the machine past the movable stops, and then the cam 44 will rock the arm 45, to the position indicated in dotted lines in Fig. 7, to cause the movable supports 61ª to be withdrawn from under the blanks 76ª and at the same time throw the adjustable stops 69 into the vertical position. The five blanks will then drop onto the continuously moving conveyor belts 10 and abut against the movable stops 69. While the follower on the arm 45 is riding on the high part of the cam the supports 61ª and the stops 69 will be held in the dotted-line positions, Fig. 7, and during this period the next five blanks issuing from the slotting and creasing machine will be dropped in succession directly upon the five which were dropped as a unit from the supports. Thus, there will be a stack of ten blanks now resting on the conveyer belts and held against movement thereon by the stop plates 62. While the eleventh blank is issuing from the creasing and slotting machine the follower 46 on the arm 45 (Fig. 7) will ride onto the steep face 44ᵇ of the cam 44 and this will result in the return of the supports 61ª to the lower full-line position, Figure 7, in time to intercept the eleventh blank, and it will also result in lowering the movable stops 69 to the horizontal position to permit the stack of ten blanks to be moved to the rear of the machine by the conveyer belts. While these ten are moving out of the way, five will be caught by the supports 61ª and will be prevented from dropping onto the moving stack. These five will then be dropped as a unit onto the delivery belt and will be prevented by the movable stops from traveling rearwardly while five more blanks will be piling, one at a time, upon the first five, forming another stack of ten blanks on the delivery belts in advance of the movable stops. These ten blanks will then be released and allowed to travel while the eleventh blanks and four succeeding blanks will be caught by the supports 61ª and prevented from dropping onto the traveling stack of ten blanks. These operations will be continued as long as blanks are delivered from the slotting and creasing machine to the stacking machine.

The number of blanks in a stack can be changed by suitably changing the gearing. The machine can be adjusted for handling blanks of different lengths by moving the carriage toward or from the slotting and creasing machine by means of gearing 7, 8 and 9.

The function of the spring 67, shown in Figs. 2 and 3, is to prevent damage to any part of the machine which might occur if some of the blanks in a stack had not passed beyond the movable stops 69 before the descent of the link 65 which rocks the stops to the vertical position. In such event, the delayed blanks would interfere with the upward swing of the stops and might result in damage to the machine if the yielding connection were not present. With the yielding connection, however, link 65 can make its full downward stroke regardless of such interference and the other parts operated by the cam and rock shafts can function as usual, without being damaged.

It will be seen from the foregoing that the work of stacking the blanks goes on without interruption while the stacked blanks are being moved to the point of delivery and while the stacks are being removed from the machine by the operator. The operator has ample time for removing a stack while a succeeding stack is building up, and as all of the stacks contain the same number of blanks, the total number of delivered blanks can easily be determined by counting the stacks.

In Figure 8, we have shown a modified form of shelf or support for intercepting and supporting the blanks as they issue from the creasing and slotting mechanism. Instead of rocking these supports, as in the previously described figures, the support shown in Fig. 8 consists of a rod 61ᵇ which is movable horizontally in a bearing 77 suspended from the cross-bar 29, and this rod is movable by a lever 78, secured to the rock shaft 47, and having a fork 78ª which engages a pin 79 on the rod. As the cam 44 rotates, the rod 61ᵇ will be projected forwardly to catch the blanks when the roller 46 on the arm 45 rides from the high part of the cam to the low part, and will be pulled backward to release the blanks when the cam rocks the lever rearwardly. It will be understood that a number of supports 61ᵇ, spaced apart laterally of the machine, will be each separately operated by a lever 78 attached to the rock shaft 47.

Figs. 10 and 11 show a further modified form of the invention. These figures show bases 80 spaced apart by a width which is a little greater than the length of the rollers of the box blank machine, and secured to each base and projecting upwardly therefrom is a side frame 81 which supports a transverse shaft 82 mounted in suitable bearings in each side frame 81. The shaft 82 is driven by means of a chain 83 which drives a sprocket 84 secured to the shaft 82 and is driven by a sprocket 85 secured to one of the rotating members D at the rear of the box blank machine shown fragmentarily at (a). The piling delivery machine B is driven from the shaft 82 by sprocket chains 86 and 87 which are selectively connected to the front shaft 88 of the piling delivery by means of the change speed clutch 89 as hereinafter more fully described. The chain 86 is driven from the shaft 82 by relatively large sprocket 90 and chain 87 by a relatively small sprocket 91 all of which sprockets 84, 90 and 91 are secured to the shaft 82 by set screws providing a convenient adjustment of the sprockets about said shaft. The chains 86 and 87 engage and drive respectively the sprockets 92 and 93 mounted to rotate on and relatively to the shaft 88. The sprockets 92 and 93 are selectively engaged with the shaft 88 by means of the change speed clutch 89 which in the form of the invention shown effects a two to one change in the speed of the shaft 88 relatively to the speed of the box blank machine. The sprockets 92 and 93 which, as shown, are of equal size having a two to one speed ratio due to the fact that the gear 90 is of twice the circumference of the gear 91 having twice as many teeth so that in the form shown when the clutch member 89' is engaged with the gear 92, the shaft 88 is driven with twice the speed of the same shaft which results when the gear 93 is engaged with shaft 88 by the opposite movement of the clutch member 89'. In this connection, it will be understood that the clutch member 89' is keyed to the shaft 88 to slide relatively thereto in the direction of its length and as further contributing to this result it is noted that the inner faces of the sprockets 92 and 93 are provided with jaw members 94 and 95 on their surfaces and the sliding clutch member 89 is provided at each end with cooperating jaw members 96 and 97 adapted to mesh with jaws carried by the sprockets 92 and 93 respectively. The clutch member 89 is shifted by means of the gear shift lever 98 which is pivoted at 99.

The shaft 82 carries intermediate of its length a sprocket 100 secured to said shaft and driving a sprocket chain 101 which extends forwardly and meshes with a sprocket 102 secured to the front transverse conveyor shaft 103 which is mounted in suitable bearings in the side frames 104 of the frame of the shiftable conveyor 105 which also comprises cross bars 140 and 141.

The shaft 103 carries secured thereto conveyor belt drive pulleys 106 suitably spaced along the shaft and driving the conveyor belts 107 which at their opposite ends are passed about conveyor belt pulleys 108 secured to the transverse shaft 109 which is mounted at its ends in bearings 110 which are adjustably mounted as best shown in Fig. 11.

The bearings 110 are carried by bracket arms 111 on each side of the machine which bracket arms are slotted longitudinally at their forward ends at 112 and also formed at 114 to fit and slide in the slots 115 in the rear ends of conveyor frame members 104—104. The slots 112 are engaged by bolts 116 which are threaded into the frame members 104—104 and a fine adjustment of said arms 111 is provided in the form of adjusting thrust screws 117 which are threaded at 118 through the frame members 104—104 and which bear at their ends against the forward ends of the arms 112. This screw adjustment has the function of a belt tightener.

The blanks as they are fed rearwardly by the shiftable conveyor belts 107 and presented thereby to the piling delivery belts 119 come in contact with the stops 62 and rest at their rearward ends on the support 61—a or the modified form of support in Figure 8, 61—b. At this time they are supported at their forward ends on the forward blank supports 120 which may be of any suitable shape being preferably as shown in plan in Fig. 10 and in side elevation in Fig. 11. These blank supports 120 are carried by the transverse rod 121 which is shown as of square cross section (see dotted lines in Fig. 11). The supports are provided with arms 122 which in Fig. 11 are substantially upright and secured to said rod by set screws 124. The arms 122 extend upwardly and forwardly at 125 above said supports 120. The square rod 121 is carried by carrier arms 126 one of which is pivotally mounted at each side of the machine at each end of the shaft 109 being shown as secured by screw bolts 127 seated in the ends of said shaft and these arms have a swinging adjustment about said shaft to determine the height and angularity of the supports 120. For this purpose the arms 126 are provided with a forward extension 128 having an arcuate slot 129 concentric with the shaft 109. These slots are engaged by bolts 130 which are threaded into the arms 111.

It will be noted that the piling delivery belts 119 correspond to the piling delivery belts 10 of the first form of the machine in Fig. 1, etc. These belts are driven by and from pulleys 131 on the shaft 88; the rear pulleys corresponding to pulleys 12 in Fig. 3, are not shown. The rear portion of the piling delivery would be of the same construction as that described in connection with Figs. 1 to 8. It is also of interest that the shaft 132 which corresponds to the shaft 17 in Figures 1 and 3 and therefore carries the sliding worm pinion 33 or some equivalent driving device is driven at its forward end by a bevel gear 133 which meshes with a bevel gear 134 on the end of the shaft 88 said gears and the end of said shaft being supported in a bracket 135 secured to and projecting laterally from the forward end of the side frame member 136 which corresponds to the side frame member 2 in Fig. 3.

This side frame member also carries a bracket 137 with positioning means 138 for the gear shift lever 98. The opposite side frame member is not shown, but the drawings show a cross bar 139 corresponding to cross bar 4 in Fig. 3.

The intermediate conveyor belts 107 which are made movable to give access to the box blank machine a may be provided with any convenient type of shifting mechanism. In the form of the invention shown, the intermediate conveyor belt frame 105 is pivotally mounted on the shaft 82 to swing from the full line operative position shown in Figure 11 to the dotted line nearly vertical position shown in the same figure, in which latter figure the intermediate conveyor belts 107 are inoperative but convenient access to the rear end of the box blank machine a is afforded. To this end the side frames 81 have formed thereon or rigidly secured thereto a forwardly and rearwardly projecting arm at each side of the machine indicated by reference characters 142. These arms are provided each of them at its upward and forward extremity with an arcuate slot 143 each of which slots is engaged by a follower pin 144 projecting from the corresponding side frame member 104. These pins when at the upper forward ends of these slots, which ends they occupy in the operative position of the intermediate conveyor belts 107 and frame 105 shown in full lines in Figure 11 are engaged by adjusting screws 145 seated in said arms and provided with lock nuts 146 by which they are held in adjusted position. The frame 105 is given a tendency to move toward and remain in operative position by springs 147 each of which is attached to one of the bases 80 at its lower end and at its upper end to a low point on the corresponding side frame 104 of the frame 105 as shown. To shift the intermediate conveyor belts 107 and the frame 105 carrying the same to give access to the rear of the box blank machine 87, it is only necessary to apply a downward thrust to the rear end of the frame adjacent the cross bar 121 thus overcoming the inertia of the frame and belts and the tension of the springs 147. In the dotted line position the springs 147 are so nearly in line with the center of shaft 82 that their tension is not sufficient to return the frame 105 to the operative or full line position, Fig. 11, and it remains in shifted position without locking, giving access to the box blank machine a.

In the construction shown, the shiftable conveyor belts in their operative position are inclined from their forward ends 148 which are immediately to the rear of the delivery rolls 149 and 150 of the box blank machine upwardly to the rear, the delivery or discharge ends 151 of said belts being above and just forwardly of the forward ends 152 of the piling delivery belts 119.

The piling mechanism carried by the carriage C, Figure 1, is in the construction, Figures 10 and 11, rearwardly of the portion illustrated being adjustable to the length of the blanks being handled. When the blanks advance beyond the ends 151 of the conveyor belts 107 their forward ends rest on the inclined supports 120 and their rearward ends are engaged by the supports 61—a or the equivalent, their extreme rearward edges bearing against the stops 62 so that a stack corresponding in number to the gear ratio between the box blank machine a and the piling delivery 85 is formed. This stack is then dropped in accordance with the explained operation of Figure 1, etc., being preferably held for a second stack forming a completed pile before the pile is advanced.

The machine shown in Figures 1, 2 and 7 is geared to form piles of ten blanks though this may obviously be varied to suit conditions by changing the gear ratio between the box blank machine and the piling delivery.

The gear shift 89, 93, 94, 96 and 97, operated by lever 98 is intended for use in changing in a quick and convenient manner the gear ratio between the box blank machine and the piling delivery mechanism to change the number of blanks in each pile. In accordance with the selected ratio illustrated, the sprockets 84 and 85 and the sprockets 90 and 92 are so related and connected as to give ten blanks to a pile and five to each half pile illustrated at 76—a in Figure 1 so that when the jaws 96 of the clutch member 89' are meshed with the jaws 94 on the sprocket 92, piles of ten are formed. If, however, it is desired to increase these piles the present gear ratio providing for twenty blanks in the larger piles, the clutch is shifted to engage the sprocket 93 with the shaft 88, it being understood that the clutch member 89' is keyed to shaft 88 and the sprockets 92 and 93 rotate freely thereon without driving the shaft except when either one of them is locked to the clutch member 89' when the corresponding sprocket drives the shaft 88 determining the size of the piles accordingly. Hence, when the clutch is shifted to engage the sprocket 93 with the shaft 88, the piling delivery is slowed down to one half speed, being driven by the small sprocket 91 on the shaft 82 giving piles of twice the size of those accumulated when the piling delivery is driven at a higher speed by way of the larger sprocket 90 on the shaft 82.

It is of importance that the piling delivery is driven from and synchronized with the box blank machine a so that uniform piles of a number of blanks predetermined by the gear ratio are formed by the piling delivery machine 85 and that when the box blank machine is slowed down or speeded up, the speed of the piling delivery machine is correspondingly changed maintaining the speed ratio and the size of the piles.

We have thus described specifically and in detail a preferred form and two modified forms of the piling delivery machine of the invention in order that the manner of constructing, applying, operating and using the invention may be fully understood, however, the specific terms herein are used descriptively rather than in a limiting sense, the scope of the invention being defined in the claims.

What we claim as new and desire to secure by Letters Patent is:

1. The combination with a machine for operating on box blanks, of means synchronized with said machine for piling blanks in stacks, containing a uniform number of blanks, as they issue from said machine comprising a conveyor onto which the blanks may drop, a stop adapted, in one position, to prevent the blanks from moving with the conveyor until a predetermined number of operations of said machine have taken place, means for then moving the stop to release the stack and permit it to travel with the conveyor away from the position in which the stack was formed, other means for intercepting a predetermined number of additional blanks issuing from said machine when the stack is released and means for releasing the additional intercepted blanks and dropping them when the stop is returned to its first-mentioned position and means for returning said stop prior to said latter release, providing successive accumulations of blanks combined in each stack.

2. The combination in a stacking and delivery mechanism adapted for use with a machine for operating on box blanks, of a moving conveyor adapted to be synchronized with said machine arranged to receive the blanks as they drop in succession from said machine, a device above the conveyor adapted, in one position, to intercept and accumulate blanks issuing from the machine and prevent them from dropping onto the conveyor, means for moving said device to another position in which it drops the accumulated blanks on the conveyor and permits additional blanks to drop on the accumulated blanks, a stop adapted, in one position, to prevent movement of the blanks by the conveyor and thereby to hold the blanks dropped from said device and to cause additional blanks to accumulate therewith in a stack, and in another position to release the stack so that it may travel with the conveyor from the stacking position, means for maintaining the stop in its last-mentioned position until a stack consisting of a predetermined number of blanks comprising both accumulations has formed on the conveyor and for then moving said device into position to intercept succeeding blanks and said stop into position to release the stack, and for returning the stop to its first-mentioned position and said device to its non-intercepting position when the stack has passed from the stacking position.

3. The combination in a stacking and delivery mechanism adapted for use with a machine for operating on box blanks, of a delivery support for the blanks at the rear of said machine, a frame, a conveyor arranged thereon with one end beneath the said delivery support to receive the blanks as they issue from said machine, a carriage mounted on the frame and adjustable toward and from the machine, supports on said carriage and over the conveyor for intercepting and supporting blanks issuing from the machine the delivery support and the supports on the carriage engaging the opposite ends of the blanks as they come from the machine, whereby the supports and the stop operate alternately in the accumulation of blanks in the formation of each stack, a movable stop, mounted on the carriage, for preventing movement of the blanks by the conveyor, means geared to said machine for moving said stop to release the blanks and simultaneously moving said movable support to a position in which it intercepts the blanks and for moving the support out of the intercepting position and simultaneously returning the stop into position for preventing the movement of blanks by the conveyor.

4. The combination with a machine for operating on box blanks, of stacking and delivery mechanism comprising a conveyor arranged at the delivery end of said machine to receive blanks issuing from the machine which drop on said conveyor a delivery support for the ends of the blanks at the rear of said machine and above the conveyor, a carriage adjustable toward and from the machine and from said delivery support, a support on the carriage for intercepting and accumulating blanks as they drop from the machine toward the conveyor the latter support and the delivery support engaging the blanks at opposite ends, a stop on the carriage extending below said support on the carriage into operative relation with said conveyor for preventing or permitting movement of the blanks by the conveyor, and means on the carriage, geared to said machine, for moving said support on the carriage into and out of position to intercept blanks and for alternately moving said stop into and out of position to prevent the blanks from moving along the conveyor whereby the support on the carriage and the stop operate alternately in the accumulation of blanks which are combined in the formation of each stack.

5. The combination in a stacking and delivery mechanism adapted for use with a machine for operating on box blanks, of a frame, a conveyor arranged on the frame below the delivery end of said machine so that blanks issuing from the machine may drop on said conveyor, a support for intercepting and accumulating blanks as they drop from the machine toward the conveyor, a carriage having a stop below said support for preventing or permitting movement of the blanks by the conveyor, a cam on the carriage adapted to be geared to said machine, a rock shaft movable by the cam, and means movable by the rock shaft for moving said support into and out of position to intercept blanks and alternately moving said stop into and out of position to stop the blanks, the stop and support operating alternately in the accumulation of blanks which are combined in each stack.

6. The combination in a stacking and delivery mechanism adapted for use with a machine for operating on box blanks, of a frame, a conveyor arranged on the frame in receiving relation to the delivery end of said machine so that blanks issuing from the machine may drop on said conveyor, a delivery support at the rear of said machine, a carriage adjustable on the frame toward and from the machine and said delivery support to accommodate blanks of different lengths, a rock shaft mounted on the carriage, a support movable by said rock shaft for intercepting and accumulating blanks as they drop from the machine toward the conveyor, a second rock shaft on the carriage, a stop movable by the latter shaft for preventing or permitting movement of the blanks by the conveyor, and means on the carriage, adapted to be geared to said machine, for rocking said shafts, and operating the latter support and stop alternately.

7. The combination in a stacking and delivery mechanism adapted for use with a machine for operating on box blanks, of a conveyor in receiving relation to the delivery end of said machine to receive blanks issuing from the machine dropped on said conveyor, said stacking and delivery mechanism comprising a cam adapted to be geared to said machine, a main rock shaft with connections for rocking the shaft from said cam, a rock shaft having a stop thereon and movable therewith to prevent or permit blanks to travel with the conveyor, means connecting said rock shafts so that they may rock together, said means including a yielding connection, and a device movable by said main rock shaft for moving said device into and out of position to intercept and accumulate blanks as they issue from said machine, said stop and said device operating alternately to accumulate and release blanks, one being in accumulating position when the other is in releasing position and vice versa.

8. The combination with a box blank machine and a stacking and delivery mechanism, the machine and the stacking and delivery mechanism being spaced apart to admit an operator between the same, providing access to the adjacent ends of both machines of a conveyor for moving the blanks from said machine to said mechanism, a frame having rotary carriers for said conveyor, one of which drives the conveyor, the operative position of which conveyor is at a wide angle to the vertical, a support for said frame located intermediately of said rotary carriers said frame being mounted to rock upon said support from said operative position toward the vertical, affording access to the portion of one said machine which is adjacent said conveyor.

9. The construction of claim 8 in which there is a rotary member adjacent said support connected to the box blank machine to be driven thereby and connected to said driving carrier to operate the same.

10. The construction of claim 8 in which there is a rotary member connected to an operating element of the box blank machine to be driven thereby and connected to said driving carrier to operate the same, the rocking of the frame taking place about an axis and said rotary member being concentric with the axis about which the frame rocks in moving from operative position toward the vertical.

11. The construction of claim 8 in which there is a rotary member connected to the box blank machine to be driven thereby and connected to said driving carrier to operate the same, the rocking of said frame taking place about an axis and said rotary member being concentric with the axis about which the frame rocks in moving from operative position toward the vertical, and means for limiting the motion of the frame at both ends of its swing.

12. A stacking and delivery mechanism adapted for use with a box blank machine, the same comprising a conveyor for delivering the blanks from said machine to said mechanism, the same being normally at a wide angle to the vertical, and a frame on which the conveyor is mounted, the frame and conveyor being pivoted to swing from normal position to a position approaching the vertical to give access to the adjacent ends of said machine and said mechanism the frame having at its rear end adjacent said piling delivery a support for the forward ends of the blanks, the piling delivery having a cooperating support for the rear ends of the blanks above the conveyor and means for withdrawing said latter support to drop the blanks when a predetermined number of blanks have been accumulated, said latter support being timed with the box blank machine.

13. The construction as defined in the preceding claim in which the support on the conveyor frame is mounted for adjustment relatively to said frame to change its angularity relatively to the vertical.

14. The construction defined as in claim 12 in which there is a bearing about which the frame rocks, said bearing being intermediate of the length of said conveyor, rotary means, mounted concentrically with said bearing and adapted to be driven from the box blank machine and connected to said conveyor to drive the same in time with said machine.

15. The construction as per claim 8 in which there is a tension spring leading from below the frame and connected to said frame at the side of its center toward the box blank machine, said spring tending to hold the frame and conveyor in operative position and being drawn in close proximity to the axis about which the frame rocks in moving toward the vertical so that the moment of the spring about said axis is so reduced that the frame and conveyor remain stationary in the rocked position, the tension of the spring being insufficient in this position to return the conveyor toward operative position.

16. The combination with a box blank machine of a piling delivery therefor consisting of a continuous conveyor, a continuously rotating cam, and a swinging support and stop alternately operated by the cam connected to the box blank machine to be driven in time therewith to accumulate piles of a predetermined number and a change speed comprising a rotary gear shift mechanism for changing the timing of the piling delivery relatively to the box blank machine to vary the number of blanks in a pile.

17. The combination in a conveyor for moving box blanks from a box blank machine to a stacking and delivery mechanism, said machine and said mechanism being arranged in operative relation end to end and spaced apart for the admission of an operator between the machines, of a frame having rotary carriers for said conveyor, one of which drives the conveyor, the operative position of the conveyor being at a wide angle to the vertical, a bearing about which the frame is mounted to rock from the operative position substantially to a vertical position, said bearing being intermediate of the length of said conveyor, rotary means mounted concentrically with said bearing and driven from the box blank machine and connected to said driving carriers to drive the same in time with the machine, driving means for the piling delivery connected to the conveyor drive, the driving means for the conveyor and the piling delivery being located near one side of the conveyor to further provide for the admission of an operator between the machines.

18. The combination with a stacking and delivery mechanism adapted for use with a box blank machine, the stacking and delivery mechanism being spaced from the box blank machine to provide for access to both machines of a conveyor for moving blanks from the box blank machine to the stacking and delivery mechanism, a frame carrying said conveyor and operating carriers therefor on said frame, the said frame and conveyor being mounted to rock from the operative position of the conveyor, which is at a wide angle to the vertical, to a position approching the vertical, a support at the rearmost end of the conveyor for the forward ends of the blanks delivered from said conveyor, the stacking and delivering mechanism having a cooperating movable support for the rear ends of the blanks, said movable support being adapted to be connected to the box blank machine to be operated thereby in time therewith to drop the blanks when a pre-determined number is accumulated, the connection from the box blank machine to the movable support comprising means whereby said support is alternately advanced and retracted, in the advanced position supporting and accumulating blanks in cooperation with the first-mentioned support, and in the retracted position releasing the blanks and permitting them to drop on the conveyor, the position of the blanks on said support being over the conveyor.

HENRY B. GREENWOOD.
THOMAS S. FITCHETT.